Patented Mar. 25, 1952

2,590,162

UNITED STATES PATENT OFFICE 2,590,162

PROCESS OF IMPREGNATING WOOD WITH SOLUBLE ARSENICAL COMPOUNDS

Viktor Ettel, Prague, Czechoslovakia, assignor to Spolek pro chemickou a hutni vyrobu, narodni podnik, also named United Chemical and Metallurgical Works, National Corporation, Prague, Czechoslovakia No Drawing. Application April 8, 1949, Serial No. 86,378. In Czechoslovakia April 14, 1948

4 Claims. (Cl. 117—151)

For the impregnation and preservation of wood various processes and materials are used, of which the oldest and most active is mercuric chloride $HgCl_2$. This material, however, shows a series of drawbacks; it strongly attacks the apparatus, it is very poisonous, and its application is therefore dangerous for the workers, and also it is readily leached out from the wood. The chief drawback, however, of mercuric chloride is its high cost.

Amongst the other salts used for the preservation of wood, zinc chloride $ZnCl_2$ has achieved a certain significance; this salt is used at the present time in spite of its small activity and strong solubility whereby it is easily leached out of the wood and in spite of the further drawback of appreciable corrosion of the apparatus by the hydrochloric acid which is hydrolytically liberated, which at the same time has also a corrosive action on the wood. It has repeatedly been attempted to increase the activity of the zinc chloride by various additions such as alkali chromates or tar oils, but in general with small success.

Also the impregnation of wood with copper salts, e. g. with copper sulphate, has had no great application although copper salts have a high activity against lower organisms such as fungi, moulds and algae. The chief drawback is in the instability of the copper salt solutions in contact with iron with the attendant corrosion of the iron apparatus.

Impregnation with ferrous salts, such as ferrous sulphate, has not attained any great significance on account of their low activity. Ferrous sulphate solutions furthermore readily oxidise and thereby liberate acids which attack the apparatus and the structure of the wood.

Fluorides, e. g. sodium fluoride, form good impregnation materials, the solutions of which have an alkaline reaction and do not attack the apparatus and the use of which is not accompanied by great danger for the personnel. Fluorides are generally used in admixture with dinitrophenol or alkali chromates. These mixtures are more active than the fluorides alone, but in their use it is necessary to reckon with increased danger to the workers. Drawbacks of the fluorides are their high price and their readiness to be leached out by water. The fluorides can be replaced by fluorosilicates; these are indeed cheap but are only slightly soluble and furthermore their solutions have a strongly acid reaction.

Recently arsenic compounds, especially sodium arsenite, have attained significance for the impregnation of wood, these being used only in admixture with dinitrophenol and sodium fluoride. These mixtures are indisputably active but they are expensive and furthermore the fluoride and the sodium arsenite are readily leached out by water. On account of the strong toxicity of the arsenite for the human organism, increased care is necessary in working with them.

Finally, the impregnation of wood has been proposed with solutions of insecticidal and fungicidal water-soluble salts which contain zinc sulphate, sodium arsenite, free arsenic acid and sodium bichromate in the molecular proportions of

$$3ZnSO_4:2Na_2HAsO_4:3H_3AsO_4:Na_2Cr_2O_7$$

in which the zinc salt can be replaced by soluble copper, cadmium or aluminium salts. Insoluble compounds such as $ZnHAsO_4$ and $CrAsO_4$ are formed by reaction taking place spontaneously in the wood, and these are not leached out from the wood after several years and give to the wood sufficient protection against fouling and insects. This method of impregnation is simple and free from danger, but its drawback lies in the need for using considerable quantities of the impregnating medium which is rather expensive.

It is therefore not surprising that at present tar oils are preponderatingly used as materials for the impregnation of wood as these show a number of advantages. They have a good preserving action and are not leached out by water and are relatively cheap. Furthermore working with them is quite free from danger of toxicity. The fractions of tar oils available for use are, however, limited; and very likely will only be obtainable in decreasing amounts as they are required for other purposes.

It is therefore desirable to seek new materials for the impregnation and preservation of wood for the preparation of which the raw materials are readily available. The impregnating material must have good activity, must be cheap and stable, and should not be leached out by water and should not attack the apparatus and should have only the lowest possible danger for the workers.

All these requirements are shown by the impregnation material used according to the present invention which essentially contains thioarsenites of alkaline earth metals. The thioarsenites have in general a composition expressed by the formula $Me_3(AsS_3)_2$ or $3MeS.As_2S_3$ in which Me denotes a bivalent metal such as Ca, Sr, Ba or Mg. Solutions also are suitable for this purpose in which the molecular proportions of the components MeS and $As_2S_3$ differ from 3:1 and in which a portion of the sulphur is replaced by oxygen. Compounds of this type can be expressed in general by the formula $xMeO.yAs_2S_3$ or $xMes.yAs_2O_3$ in which $x$ and $y$ are small whole numbers. Obviously also mixtures of the materials thus defined can be used.

Compounds of this type can be prepared in the form of thickened colloidal solutions with a density of 1.16 to 1.20 and containing up to 20% of thioarsenite content. The compounds obtained in solid form are not suitable for impregnation of wood as they become insoluble in water when they have once been obtained in the solid form.

This particular property, namely, high activity and long stability of the impregnated wood is, however, just the reason for their practical utility.

In the actual impregnation of wood strongly diluted solutions containing 1–3% of thioarsenites are used. These solutions are relatively only slightly poisonous, and are sufficiently free from danger for use in spite of the strong toxicity of the starting material $As_2O_3$. The active component of the impregnating solution becomes converted after drying in the wood fibres by the influence of the atmosphere into a form not liable to be leached out by water, but nevertheless remains subsequently active against the fungi which are injurious to wood.

The impregnation solutions are obtained by dissolving freshly precipitated arsensic trisulphide in a solution of alkaline earth sulphide or sulphydrate and concentration of the solution. Solutions having analogous composition can be obtained by dissolving arsenic trioxide in alkaline earth sulphides or sulphydrates, while introducing hydrogen sulphide into the product, or conversely introducing arsenic trisulphide or arsenic trioxide into alkaline earth hydroxides while introducing hydrogen sulphide into the product. In this manner solutions are obtained of alkaline earth thioarsenites having a variable composition according to the conditions of the reaction, whereby a portion of the sulphur in the formulae given above can be replaced by oxygen.

The thioarsenite solutions formed having a density of 1.20 and containing about 20% of active material, can be kept without decomposition by storage with the exclusion of air. The solutions slowly decompose on exposure to air by the action of oxygen and carbon dioxide whereby a sparingly soluble crystalline precipitate is obtained.

In the practical impregnation of wood decorticated wood is placed in a steel vessel which is evacuated for a certain time to 100–150 mm./Hg. and thereupon the impregnating solution having a thioarsenite content of 1.5 to 3.0% is allowed to run into the vessel and the contents of the vessel subjected to a pressure of 5–10 atmospheres, until the wood is completely saturated with the impregnating liquid. After releasing the pressure, the impregnating solution is removed, the liquid allowed to drain from the wood, the wood taken out of the vessel and exposed to the air for a month. The impregnated wood is then ready for use.

Superficial impregnation of the wood can also be carried out by coating, for example by brushing, for which purpose a thickened arsenite solution is used which is then allowed to dry in the air. The coating is then repeated once or twice and the wood then left for a month to dry thoroughly.

Examples

For testing the new preparation and comparing it with the known means for impregnation, experiments have been undertaken on the impregnation of small blocks of wood which were then subjected to the action of fungi harmful to wood. Some tests were made after impregnation alone and some after impregnation and subsequent leaching with water, so as to test both the activity and also the stability of the impregnating agent. As impregnating agents according to the invention solutions of barium and calcium thioarsenite were investigated and solutions of $BaCl_2$, $ZnCl_2$ and $HgCl_2$ were used for comparison. The solution of barium thioarsenite used had a density of 1.105 at 20° C. and contained 71.4 g. $As_2S_3$ and 57.7 g. BaS making a total of 130.7 g. per litre of dry material, i. e. the solution was about 12%; the molecular proportions were 1 $As_2S_3$:1.17 BaS.

By diluting the original solution, the actual impregnating solutions were obtained containing 1.5% and 3.0% of the dissolved impregnating material. Solutions of the same concentrations were prepared from barium chloride, zinc chloride and $HgCl_2$.

The comparison impregnating tests were carried out with small blocks of white pine wood. Dry blocks were saturated with the solution used at a diminished pressure of 110–160 mm./Hg. The increase in weight enables the quantity of impregnating material absorbed in the wood to be determined. The small blocks were then allowed to dry for four weeks in the air and thereupon were subjected to the action of fungi harmful to wood, namely, Coniophora cerebella, Polyporous vaporarius, Merulius lacrimans. These investigations lasted four months at a temperature of 20° C. and a relative humidity of 60–70% with partial darkening. After the end of the period of investigation the blocks were freed from the growth of fungi, dried, weighed and the loss of weight due to the growth of fungi was thus determined. The difference between the corrected original weight and end weight of the wood gave the loss of weight in percentage of the original weight of the wood. A loss of weight of up to 5% was regarded as showing no damage by the fungi. The results of the experiments are shown in Table I.

Table I

| Impregnation material and its concentration in the solution used | Average content of the impregnating material in the wood in Kg./cubic metre | Average loss of weight by the action of the injurious fungi expressed in percentage of the wood | |
|---|---|---|---|
| | | Impregnated | Impregnated and leached |
| $BaAs_2S_4$, 1.5% | 6.2 | 0.3 | x |
| $BaAs_2S_4$, 3.0% | 11.6 | 0.3 | 0.0 |
| Not impregnated, 0.0% | 0.0 | 24.9 | 39.0 |
| $BaCl_2$, 1.5% | 6.5 | 10.0 | x |
| $BaCl_2$, 3.0% | 11.8 | 10.4 | x |
| Not impregnated, 0.0% | 0.0 | 28.3 | x |
| $ZnCl_2$, 1.5% | 6.5 | 1.4 | x |
| $ZnCl_2$, 3.0% | 13.6 | 1.1 | x |
| Not impregnated, 0.0% | 0.0 | 19.4 | x |
| $HgCl_2$, 1.5% | 6.5 | 0.9 | x |
| $HgCl_2$, 3.0% | 12.7 | 0.4 | x |
| Not impregnated, 0.0% | 0.0 | 34.7 | x | x—not investigated.

From the results of these experiments it can be seen that even when using a 1.5% solution of the impregnating material according to the invention, complete protection is obtained against fungi injurious to wood; the action is at least equal to that of solutions of $ZnCl_2$ and $HgCl_2$.

In addition, experiments were made to determine the capacity of the impregnating material to be leached out, for which purpose calcium thioarsenite having an approximate composition of $Ca_3(AsS_3)_2$, barium thioarsenite with an approximate composition of $BaAs_2S_4$, and also $BaCl_2$, $ZnCl_2$ and $HgCl_2$ were used. Solutions having a density of 1.023 and a concentration of 2.5% were used for the impregnation. The wooden blocks were impregnated with this solution under reduced pressure in the usual manner and then the amount of impregnating material contained in the wood was determined and the wood was then dried in the air for four weeks and then subjected to progressive extraction with water for a total of 95 hours. The capacity of the material to be leached out is given in percentages calculated from the ratio of the impregnating material remaining in the wood to the amount originally incorporated in the wood.

*Table II*

| Impregnating material | $Ca_3(AsS_3)_2$ | $BaAs_2S_4$ | $BaCl_2$ | $ZnCl_2$ | $HgCl_2$ |
|---|---|---|---|---|---|
| Amount of impregnating material in the wood in Kg./cubic metre | 20.5 | 11.0 | 16.5 | 17.0 | 16.3 |
| Proportion of material leached out in percent | 45.6 | 27.4 | 87.2 | 97.5 | 69.7 |

From this table it can be seen that the power of the material to be leached out is definitely lower than that of the previously used materials. After the impregnation according to the present invention there are formed in the wood insoluble compounds which nevertheless remain active against the injurious fungi and thereby increase the keeping quality of the wood.

What I claim and desire to secure by Letters Patent is:

1. A process of impregnating wood, comprising the steps of treating wood with an aqueous solution of a thioarsenite of a concentration of one to three percent, containing as cation a metal selected from the group consisting of Ca, Sr, Ba and Mg, and then allowing the impregated wood to dry in the air, thus transforming the said compound inside the wood into insoluble form.

2. A process of impregnating wood, comprising the steps of treating wood with an aqueous solution of a thioarsenite of a concentration of one to three percent, containing as cation a metal selected from the group consisting of Ca, Sr, Ba and Mg, in which sulphur is partly replaced by oxygen, and then allowing the impregnated wood to dry in the air, thus transforming the said compound inside the wood into insoluble form.

3. A process of impregnating wood, comprising the steps of treating wood with an aqueous solution of a thioarsenite of a concentration of one to three percent, containing as cation more than one metal selected from the group consisting of Ca, Sr, Ba and Mg and then allowing the impregnated wood to dry in the air, thus transforming the said compound inside the wood into insoluble form.

4. A process of impregnating wood, comprising the steps of treating wood with an aqueous solution of a thioarsenite of a concentration of one to three percent, containing as cation more than one metal selected from the group consisting of Ca, Sr, Ba and Mg, in which sulphur is partly replaced by oxygen, and then allowing the impregnated wood to dry in the air, thus transforming the said compound inside the wood into insoluble form.

VIKTOR ETTEL.

REFERENCES CITED

The following references are of record in the file of this patent:

UNITED STATES PATENTS

| Number | Name | Date |
|---|---|---|
| 107,620 | Nickerson | Sept. 20, 1870 |
| 1,151,204 | Loud | Aug. 24, 1915 |
| 1,753,000 | Walker | Apr. 1, 1930 |
| 2,088,639 | McIlvaine | Aug. 3, 1937 |

OTHER REFERENCES

Mellor's Modern Inorganic Chem., Longmans, Green Co., N. Y. 1939, page 746.

Frear, Chem. of Insecticides, Fungicides & Herbicides, 2nd ed., 1948, D. Van Nostrand Co., page 13.